US012487335B2

(12) United States Patent
Yang et al.

(10) Patent No.: US 12,487,335 B2
(45) Date of Patent: Dec. 2, 2025

(54) RECEIVING SYSTEM FOR LIDAR, LIDAR AND METHOD FOR INHIBITING GHOST LINES

(71) Applicant: HESAI TECHNOLOGY CO., LTD., Shanghai (CN)

(72) Inventors: Jintao Yang, Shanghai (CN); Shaoqing Xiang, Shanghai (CN)

(73) Assignee: Hesai Technology Co., Ltd., Shanghai (CN)

( * ) Notice: Subject to any disclaimer, the term of this patent is extended or adjusted under 35 U.S.C. 154(b) by 1009 days.

(21) Appl. No.: 17/563,305

(22) Filed: Dec. 28, 2021

(65) Prior Publication Data

US 2022/0120869 A1    Apr. 21, 2022

Related U.S. Application Data

(63) Continuation of application No. PCT/CN2019/103724, filed on Aug. 30, 2019.

(51) Int. Cl.
G01S 7/481     (2006.01)
G01S 17/48    (2006.01)

(52) U.S. Cl.
CPC ............ *G01S 7/4816* (2013.01); *G01S 17/48* (2013.01)

(58) Field of Classification Search
None
See application file for complete search history.

(56) References Cited

U.S. PATENT DOCUMENTS 3,768,908 A * 10/1973 Zaromb ............... G01J 3/44
356/342
6,873,716 B1 * 3/2005 Bowker ................ G01S 17/42
382/128

(Continued)

FOREIGN PATENT DOCUMENTS

CN     2624203        7/2004
CN     101963869 A    2/2011

(Continued)

OTHER PUBLICATIONS

First Search dated Nov. 27, 2024, issued in related Chinese Patent Application No. 202010857698.4 (3 pages).

(Continued)

*Primary Examiner* — Luke D Ratcliffe
(74) *Attorney, Agent, or Firm* — Sheppard Mullin Richter & Hampton LLP

(57) ABSTRACT

A receiving system for a lidar, comprises: a receiving lens, configured to receive echoes of a detection laser beam reflected by an object from an exterior of the lidar; a reflective structure, disposed downstream of an optical path of the receiving lens, to receive the echoes from the receiving lens, and change a propagation direction of the echoes by reflection; a detector, disposed downstream of an optical path of the reflective structure to receive a reflected echo from the reflective structure; and a ghost line reduction device, disposed between the reflective structure and the detector, wherein the ghost line reduction device includes a physical structure to block an echo that causes a ghost line in a point cloud of the lidar from entering the detector. The receiving system resolves the misrecognition problem caused by ghost lines in the point cloud to improve the detection accuracy of the lidar.

11 Claims, 6 Drawing Sheets

(56) References Cited

U.S. PATENT DOCUMENTS

| | | | |
|---|---|---|---|
| 2018/0180470 A1 | 6/2018 | Seitz | |
| 2018/0301589 A1 | 10/2018 | Burroughs et al. | |
| 2018/0323576 A1 | 11/2018 | Crawford et al. | |
| 2019/0072649 A1* | 3/2019 | Droz | G01S 7/4812 |
| 2019/0227175 A1 | 7/2019 | Steinberg et al. | |
| 2020/0178361 A1 | 6/2020 | Oka | |
| 2020/0219702 A1 | 7/2020 | Prager et al. | |

FOREIGN PATENT DOCUMENTS

| | | |
|---|---|---|
| CN | 102931867 | 2/2013 |
| CN | 103018735 A | 4/2013 |
| CN | 103954955 A | 7/2014 |
| CN | 103994719 A | 8/2014 |
| CN | 105158934 A | 12/2015 |
| CN | 204855797 U | 12/2015 |
| CN | 106154248 A | 11/2016 |
| CN | 205861904 U | 1/2017 |
| CN | 108474849 A | 8/2018 |
| CN | 108594263 A | 9/2018 |
| CN | 108631151 | 10/2018 |
| CN | 108711907 | 10/2018 |
| CN | 108873125 A | 11/2018 |
| CN | 109188451 A | 1/2019 |
| CN | 208421218 U | 1/2019 |
| CN | 109728501 | 5/2019 |
| CN | 109814082 A | 5/2019 |
| CN | 110535028 | 12/2019 |
| CN | 110780284 A | 2/2020 |
| CN | 111244752 | 6/2020 |
| CN | 111381246 A | 7/2020 |
| CN | 111398935 A | 7/2020 |
| CN | 111919137 A | 11/2020 |
| EP | 0720027 | 7/1996 |
| JP | 2007-333592 A | 12/2007 |
| JP | 2008-139199 A | 6/2008 |

OTHER PUBLICATIONS

First Search dated Nov. 28, 2024, issued in related Chinese Patent Application No. 202010858924.0 (3 pages).

Ruolan Li, "Longitudinal Flow CO2 Laser Excitation Power Supply," Industrial & Science Tribune, China Academy Journal Electronic Publishing House, Oct. 30, 2016, pp. 42-43, with English language abstract.

Wei Zhang et al., "High-Voltage Pulse Power Supply for Ion Source Based on Pulse Frequency Modulation Mechanism," China Academy Journal Electronic Publishing House, Aug. 20, 2020, pp. 90 and 92, with English language abstract.

PCT International Search Report and the Written Opinion mailed Jun. 4, 2020, issued in related International Application No. PCT/CN2019/103724, with partial English translation (11 pages).

First Search dated Oct. 18, 2024, issued in related Chinese Application No. 201980097646.7 (2 pages).

First Office Action and Search Report dated Jan. 8, 2025, issued in related Chinese Patent Application No. 202011408854.5, with English machine translation (26 pages).

Zhen-yi Chen et al., "Analysis of Backscattering Signal for a Ceilometer," Journal of Atmospheric and Environmental Optics, vol. 4, No. 1, Jan. 31, 2009, pp. 75-80, with English language abstract.

Hanjun Luo et al., "Detection Range of Photon Counting Laser Radar Based on Geiger-mode APD," Opto-Electronic Engineering, vol. 40, No. 12, Dec. 2013, pp. 80-88, with English language abstract.

Bingna Zhang et al., "Automatic Adjustment Technology of Diaphragm Used for Large Dynamic Laser Ranging with Centimetre Grade Precision," Infrared and Laser Engineering, vol. 42, No. 7, Jul. 2013, pp. 1788-1792, with English language abstract.

Yuan Luo et al, "Long-Distance Laser Ranging Lidar Based on Photon Counting Technology," Chinese Journal of Lasers, vol. 43, No. 5, May 2016, pp. 1-8, with English language abstract.

Second Office Action and Supplementary Search Report dated May 16, 2025, issued in related Chinese Patent Application No. 202011408854.5, with English machine translation (31 pages).

* cited by examiner

RECEIVING SYSTEM FOR LIDAR, LIDAR AND METHOD FOR INHIBITING GHOST LINES

CROSS-REFERENCE TO RELATED APPLICATION

This application is a continuation application of International Patent Application No. PCT/CN2019/103724, filed on Aug. 30, 2019. The entire content of the above identified application is incorporated herein by reference.

TECHNICAL FIELD

The present disclosure relates to the field of lidar technologies, and in particular, to a receiving system for a lidar, a lidar, and a method for suppressing ghost lines.

BACKGROUND

Currently, in important application scenarios of artificial intelligence such as autonomous driving and assisted driving of an intelligent networked vehicle, service robots, and other fields, a lidar is a core sensor for sensing the environment. The working principle of the lidar is to detect a target by emitting laser beams, and to form a point cloud and acquire data by collecting reflected light beams. The data can be photoelectrically processed into an accurate three-dimensional image. By adopting this technology, high-precision information of a physical spatial environment can be accurately acquired, and the ranging accuracy can reach a centimeter level.

When the focal length of lens is identical, a lidar with a folding reflective structure, i.e., a reflective structure having two or more mirrors between the receiving lens and the detector for folding the optical path, can have a smaller structural size, which is an architecture of mainstream multi-line mechanical lidars currently. When the lidar with the folding reflective structure scans a high-reflectivity board (which is a high-reflectivity obstacle, such as a road sign) in a short range, as shown in FIG. 1, ghost lines appear in an obtained point cloud of the lidar, that is, some point clouds that do not actually exist appear on left and right sides of the high-reflectivity board. During autonomous driving, when the lidar scans a high-reflectivity road sign, the ghost lines generated in the point cloud of the lidar are recognized as an obstacle, resulting in automatic stopping of the vehicle.

It is of great significance to design a lidar that suppresses ghost lines of a short-range high-reflectivity board. The present disclosure provides a receiving system for a lidar and a method to effectively suppress the generation of ghost lines in a point cloud of a lidar by a short-range high-reflectivity obstacle, and minimize the impact on the ranging capability.

The content of the background part represents only technologies known to the inventor, and does not necessarily represent the prior art in the field.

SUMMARY

In view of the previous discussion the present disclosure is intended to provide an improved solution for a lidar to suppress ghost lines.

In an aspect, a receiving system for a lidar is provided, including: a receiving lens, configured to receive echoes of a detection laser beam reflected by an object from an exterior of the lidar; a reflective structure, disposed downstream of an optical path of the receiving lens, to receive the echoes from the receiving lens, and change a propagation direction of the echoes by reflection; a detector, disposed downstream of an optical path of the reflective structure to receive a reflected echo from the reflective structure; and a ghost line reduction device, disposed between the reflective structure and the detector, wherein the ghost line reduction device includes a physical structure to block an echo that causes a ghost line in a point cloud of the lidar from entering the detector.

In an embodiment, the ghost line reduction device includes an aperture.

In an embodiment, the aperture and the detector satisfy the following relationship:

$$\arctan\left(\frac{d}{2h}\right) \leq \arctan\left(\frac{D}{2f}\right)$$

where D represents a diameter of the receiving lens, f represents a focal length of the receiving lens, h represents a distance between the aperture and the detector, and d represents a width of the aperture.

In an embodiment, the aperture comprises a slot-shaped aperture or a circular-shaped aperture, and the aperture is made of one of following materials: metal, glass capable of absorbing or reflecting light, or ceramic.

In an embodiment, the ghost line reduction device includes a light barrier plate.

In an embodiment, the ghost line reduction device includes a plurality of light barrier plates.

In an embodiment, the reflective structure includes a plurality of mirrors, and the ghost line reduction device is configured to block an echo other than an echo that is reflected once by the mirrors of the reflective structure.

In an embodiment, the reflective structure includes a first mirror and a second mirror that are disposed opposite to each other, the detector includes a photodiode, and the ghost line reduction device is configured to block an echo other than an echo that is reflected once by the first mirror and once by the second mirror.

In an embodiment, the ghost line reduction device includes an aperture and a light barrier plate.

In another aspect, a lidar is further provided, including: an emitting system comprising a plurality of emitters to emit a detection laser beam; and the receiving system as described above, configured to receive echoes of the detection laser beam reflected by an object.

In still another aspect, a method for suppressing ghost lines for a lidar is further provided, including: receiving, through a receiving lens, echoes of a detection laser beam reflected by an object from an exterior of the lidar; receiving, through a reflective structure, the echoes from the receiving lens, and changing a propagation direction of the echoes by reflection; blocking an echo that causes a ghost line in a point cloud of the lidar; and receiving an unblocked echo from the reflective structure through a detector.

In an embodiment, blocking an echo that causes a ghost line in the point cloud of the lidar comprises: blocking an echo that causes the ghost line in the point cloud of the lidar through an aperture and/or a light barrier plate.

According to the embodiments of the present disclosure, by blocking the optical path of a ghost line field of view, the number of ghost lines generated by a short-range high-reflectivity board is effectively reduced.

By using the ghost line reduction device, such as the aperture and/or the light barrier plate, the receiving system for a lidar of the present disclosure suppresses the ghost lines generated by the short-range high-reflectivity board, avoids misrecognition of left and right ghost lines of a road sign as an obstacle in autonomous driving, and improves the resolution of the lidar.

BRIEF DESCRIPTION OF THE DRAWINGS

The drawings constituting a part of the present disclosure are used to provide a further understanding of the present disclosure, and embodiments and descriptions of the present disclosure are used to explain the present disclosure, and do not constitute an improper limitation of the present disclosure.

DETAILED DESCRIPTION

Figure 1:
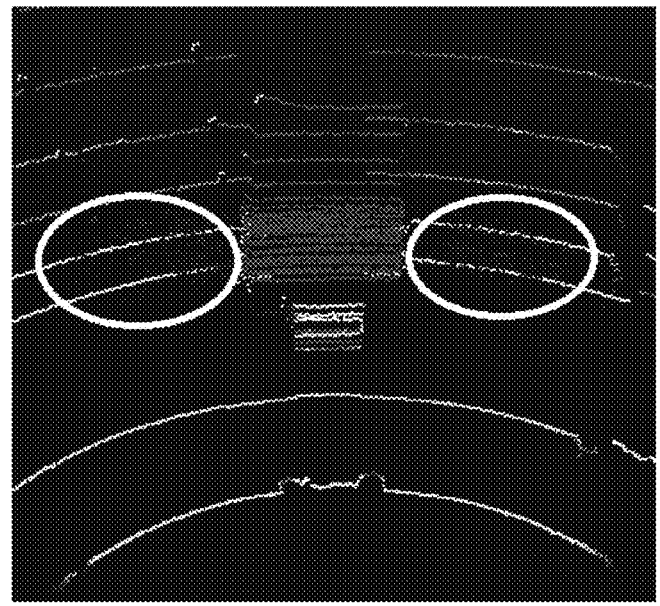
FIG. 1 shows a schematic diagram of ghost lines in a point cloud of a lidar according to an embodiment of the present disclosure.

Only some embodiments are briefly described below. As those skilled in the art can realize, the described embodiments may be modified in various different ways without departing from the spirit or the scope of the present disclosure. Therefore, the drawings and the description are to be considered as illustrative in nature but not restrictive.

In the description of the present disclosure, it should be understood that directions or location relationships indicated by terms "center", "longitudinal", "transverse", "length", "width", "thickness", "upper", "lower", "front", "rear", "left", "right", "vertical", "horizontal", "top", "bottom", "inner", "outer", "clockwise", and "counterclockwise" are directions or location relationships shown based on the accompanying drawings, are merely used for the convenience of describing the present disclosure and simplifying the description, but are not used to indicate or imply that a device or an element needs to have a particular direction or needs be constructed and operated in a particular direction, and therefore, cannot be understood as a limitation to the present disclosure. In addition, the terms such as "first" and "second" are used only for the purpose of description, and should not be understood as indicating or implying the relative importance or implicitly specifying the quantity of the indicated technical features. Therefore, a feature restricted by "first" or "second" may explicitly indicate or implicitly include one or more such features. In the description of the present disclosure, the meaning of "plurality" is two or more unless specifically defined otherwise.

In the descriptions of the present disclosure, it should be noted that, unless otherwise specified or defined, the terms such as "install", "mount", and "connection" should be understood in a broad sense, for example, the connection may be a fixed connection, a detachable connection, or an integral connection: or the connection may be a mechanical connection, or may be an electrical connection or communication with each other; or the connection may be a direct connection, an indirect connection through an intermediary, or internal communication between two components or mutual interaction relationship between two components. A person of ordinary skill in the art can understand specific meanings of the terms in the present disclosure based on specific situations.

In the present disclosure, unless otherwise explicitly stipulated and restricted, that a first feature is "above" or "under" a second feature may include that the first and second features are in direct contact, or may include that the first and second features are not in direct contact but in contact by using other features therebetween. In addition, that the first feature is "on", "above", or "over" the second feature includes that the first feature is right above and on the inclined top of the second feature or merely indicates that a level of the first feature is higher than that of the second feature. That the first feature is "below", "under", or "beneath" the second feature includes that the first feature is right below and at the inclined bottom of the second feature or merely indicates that a level of the first feature is lower than that of the second feature.

The following disclosure provides many different embodiments or examples for achieving different structures of the present disclosure. In order to simplify the disclosure of the present disclosure, components and settings of specific examples are described below. Certainly, they are merely examples, and are not intended to limit the present disclosure. In addition, the present disclosure may repeat reference numerals and/or reference letters in different examples. The repetition is for the purpose of simplification and clarity, but does not indicate a relationship between the various embodiments and/or settings discussed. In addition, the present disclosure provides examples of various specific processes and materials, but those of ordinary skill in the art may be aware of the application of other processes and/or use of other materials.

Embodiments of the present disclosure are described below with reference to the drawings. It should be understood that the embodiments described herein are merely used to illustrate and explain the present disclosure, and are not used to limit the present disclosure.

Figure 2:
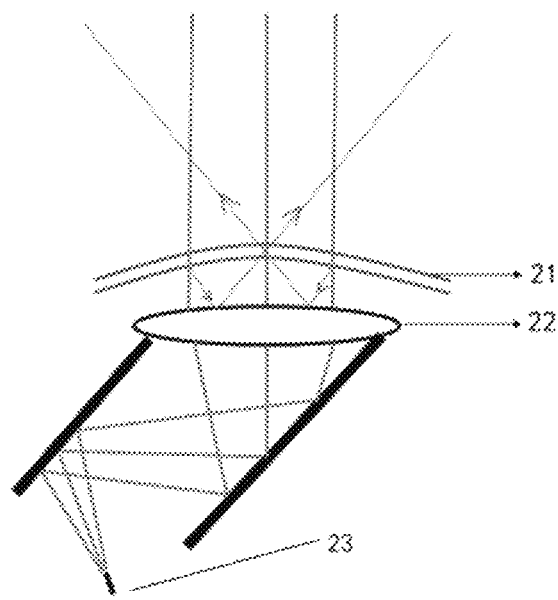
FIG. 2 shows a schematic diagram in which ghost lines are caused by an emitting module according to an embodiment of the present disclosure.

The applicant found that, for a lidar with a folding reflective structure, ghost lines may be caused by a plurality of factors. FIG. 2 shows a schematic diagram in which ghost lines are caused by an emitting module. At the emitting module of the lidar, because the transmittance of a coating on an emitting lens 22 is not 100%, a laser emitted by a laser emitter 23 is reflected a plurality of times at each interface between air and glass of the emitting lens 22 and a photomask 21 before exiting. Thus, the laser spot that ultimately illuminates a short-range target is quite large. Although the laser spot, other than the center, has very low energy, it is still possible to be detected when the target has a very high reflectivity.

Figure 3:
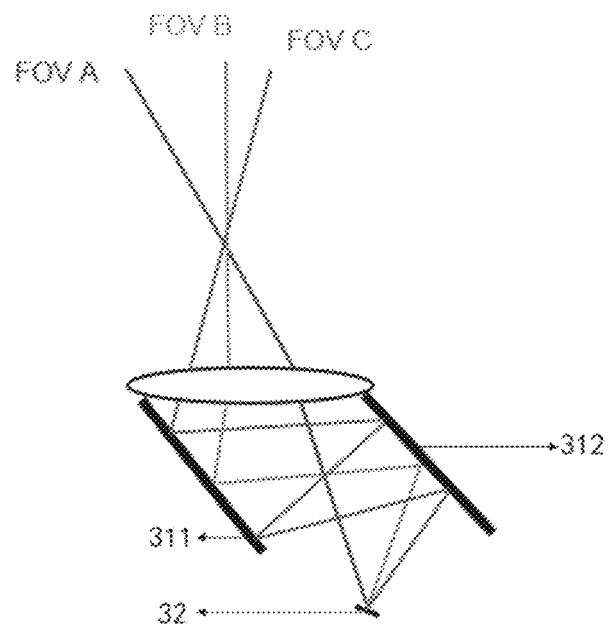
FIG. 3 shows a schematic diagram in which ghost lines are caused by a receiving module according to an embodiment of the present disclosure.

FIG. 3 shows a schematic diagram in which ghost lines are caused by a receiving module. At the receiving module of the lidar, in an optical path of a folding reflective structure, in addition to a main field of view where light beams are respectively reflected once by mirrors, there is also a field of view where light beams are not reflected by the mirror and a field of view where light beams are reflected by the mirror a plurality of times with a total number exceeding the number of mirrors. When the lidar scans, a detector at the receiving module receives the light beams that are not reflected by the mirror and/or the light beams that are reflected by the mirror a plurality of times with the total number exceeding the number of mirrors, thereby causing ghost lines. As shown in FIG. 3, the field of view of the lidar includes: a main field of view FOVB and ghost line fields of view FOVA and FOVC. The main field of view FOVB is a field of view where light beams are reflected once by a first mirror 311 and a second mirror 312, the ghost line field of view FOVA is a field of view where the light beams are not reflected by the first mirror 311 and the second mirror 312, and the ghost line field of view FOVC is a field of view where the light beams are reflected by the first mirror 311 and the second mirror 312 more than twice in total.

Assuming that the lidar scans counterclockwise, when the main field of view FOVB is still outside a high-reflectivity board, the ghost line field of view FOVA is already on the high-reflectivity board. Because the high-reflectivity board is in a short range, and the high-reflectivity board is illuminated by a large laser spot of the emitting module, a detector 32 receives light beams through an optical path of the ghost line field of view FOVA, and ghost lines on a right side of the high-reflectivity board are generated. The lidar continues to scan, and when the main field of view FOVB leaves the high-reflectivity board and the ghost line field of view FOVC is still on the high-reflectivity board, the detector 32 can still receive reflected light beams of the high-reflectivity board through an optical path of the ghost line field of view FOVC, and ghost lines on a left side of the high-reflectivity board are generated. Alternatively, when the lidar scans clockwise, the ghost line field of view FOVC is on the high-reflectivity board before the main field of view FOVB is, and when the main field of view FOVB leaves the high-reflectivity board and the ghost line field of view FOVA is still on the high-reflectivity board, the ghost line fields of view FOVA and FOVC respectively result in the ghost lines on the right and left sides of the high-reflectivity board. The detector 32 may be, but is not limited to, a photodiode, such as an avalanche photodiode (APD).

In order to reduce or suppress the foregoing ghost lines, the present disclosure provides a receiving system for a lidar, including: a receiving lens, a reflective structure, a detector, and a ghost line reduction device. The reflective structure is disposed downstream of an optical path of the receiving lens, the detector is disposed downstream of an optical path of the reflective structure, and the ghost line reduction device is disposed between the reflective structure and the detector. An external light beam enters the reflective structure through the receiving lens, whose propagation direction is changed by reflection of a plurality of mirrors in the reflective structure, and then passes through the ghost line reduction device. Some or all of light beams that cause ghost lines in a point cloud of the lidar are blocked by the ghost line reduction device, and finally the remaining light beams reach the detector.

The field of view of the lidar in the embodiments of the present disclosure includes: a main field of view and a ghost line field of view. The main field of view is a field of view where light beams are reflected once by each mirror, and the ghost line field of view is a field of view where the light beams are not reflected by the mirror and/or are reflected by the mirror a plurality of times with a total number exceeding the number of mirrors. Because there is a gap between the ghost line field of view and the main field of view at a specific position on an optical path, an aperture and/or a light barrier plate device may be used as the ghost line reduction device for blocking an optical path of the ghost line field of view, thereby suppressing the generation of the ghost lines in the point cloud of the lidar by the short-range high-reflectivity board.

An embodiment of the present disclosure is described in detail below with reference to FIG. 4A to FIG. 6.

Figure 4A:
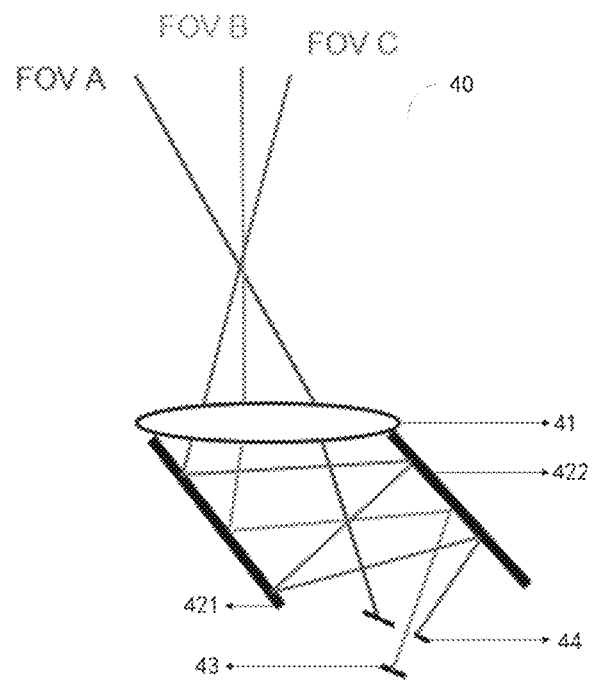
FIG. 4A shows a schematic diagram of a receiving system in which an aperture suppresses ghost lines according to an embodiment of the present disclosure.

FIG. 4A shows a schematic diagram of a receiving system 40 for a lidar according to an embodiment of the present disclosure. As shown in FIG. 4A, the receiving system 40 for a lidar includes: a receiving lens 41, a reflective structure, an aperture 44, and a detector 43. The reflective structure includes a first mirror 421 and a second mirror 422. The receiving lens 41 may receive an external light beam, for example, a light beam of an emergent laser beam of the lidar that is reflected back by an external obstacle. The first mirror 421 and the second mirror 422 are disposed downstream of an optical path of the receiving lens 41, and are disposed opposite to each other (e.g., facing to each other). The light beam received by the receiving lens is incident on the reflective structure, whose propagation direction is changed by reflection of the first mirror 421 and the second mirror 422. The detector 43 is disposed downstream of an optical path of the reflective structure, and is used for receiving the light beam from the reflective structure and generating an electrical signal. The electrical signal undergoes further signal processing such as filtering, amplification, AD conversion, or digital signal processing to form point cloud data of the lidar. The aperture 44 is disposed between the reflective structure and the detector 43 to allow light of the main field of view to pass through and enter the detector 43, and suppress some light beams from passing through, for example, prevent some or all of light beams that cause ghost lines in a point cloud of the lidar from passing through, to prevent the light beams that cause the ghost lines from entering the detector. As shown in FIG. 4A, a light beam corresponding to the main field of view FOVB is deflected after passing through the receiving lens 41, is incident on the first mirror 421 and reflected by the first mirror 421, and is then reflected by the second mirror 422. Finally, the light beam reflected by the second mirror 422 may pass through the aperture 44 and impinge on the detector 43 to generate the electrical signal. A light beam corresponding to the ghost line field of view FOVA is not incident on the first mirror 421 or the second mirror 422 after passing through the receiving lens 41, but impinges directly on the aperture 44 and is blocked or absorbed by the aperture 44 to avoid impinging on the detector 43 to generate the ghost lines in the point cloud of the lidar. A light beam corresponding to the ghost line field of view FOVC is incident on the first mirror 421 after passing through the receiving lens 41, is reflected by the first mirror 421 to the second mirror 422, and reflected by the second mirror 422 to the first mirror 421, and is then reflected once again by the first mirror 421 and the second mirror 422 respectively. Finally, the light beam is incident on the aperture 44, and blocked or absorbed by the aperture 44 to avoid impinging on the detector 43 to generate the ghost lines in the point cloud of the lidar.

Therefore, by arranging the aperture 44 between the reflective structure and the detector 43 as a ghost line reduction device, light that cause the ghost lines in the point cloud of the lidar can be at least partially prevented from entering the detector 43.

In addition, a person skilled in the art can easily understand that there are two mirrors in the embodiment of FIG. 4A, which is only illustrative, or more mirrors may be included. For example, there may alternatively be three or four mirrors. The disclosure does not constitute any limitation on the number of mirrors.

According to an embodiment of the present disclosure, when a distance between the aperture 44 and the detector 43 satisfies a certain relationship, the light beams of the ghost line fields of view FOVA and FOVC can be better blocked.

Figure 4B:
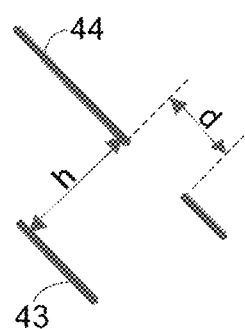
FIG. 4B shows a schematic diagram of parameters of an aperture and a detector.

Specifically, assuming that a diameter of the receiving lens 41 is D and a focal length is f, the distance between the aperture 44 and the detector 43 (for example, a single APD, or an APD linear array or area array) is h, and a horizontal width of an aperture of the aperture 44 is d (as shown in FIG. 4B), when the horizontal width d of the aperture of the aperture 44 and the distance h between the aperture 44 and the detector 43 satisfy the following relational expression, the light beams of the ghost line fields of view FOVA and FOVC can be better blocked:

$$\arctan\left(\frac{d}{2h}\right) \le \arctan\left(\frac{D}{2f}\right)$$

As shown in FIG. 4A, when the lidar scans counterclockwise or clockwise, the light beams of the ghost line fields of view FOVA and FOVC are blocked by the aperture 44 and cannot reach the detector 43, but the light beams of the main field of view FOVB can reach the detector 43 through the aperture of the aperture 44, thereby suppressing or even eliminating ghost lines caused by a short-range high-reflectivity board in a point cloud of the lidar, avoiding misrecognition of the lidar, and improving the detection accuracy.

As described above, the reflective structure may include a plurality of mirrors, and the ghost line reduction device, for example, the aperture 44, is configured to block a light beam that is not reflected once by the reflective structure. In the present invention, the light beam that is reflected once by the reflective structure refers to the light beam that is reflected once by each mirror in the reflective structure (such as the field of view FOVB in FIG. 4A); and the light beam that is not reflected once by the reflective structure refers to that the light beam is not reflected by at least one of the mirrors (such as the light beam corresponding to the ghost line field of view FOVA in FIG. 4A), or is reflected by at least one of the mirrors more than twice (such as the light beam corresponding to the ghost line field of view FOVC in FIG. 4A).

In the receiving system according to an embodiment of the present disclosure, the aperture may be made of metal, glass capable of absorbing or reflecting light, or ceramic.

Figure 5A:
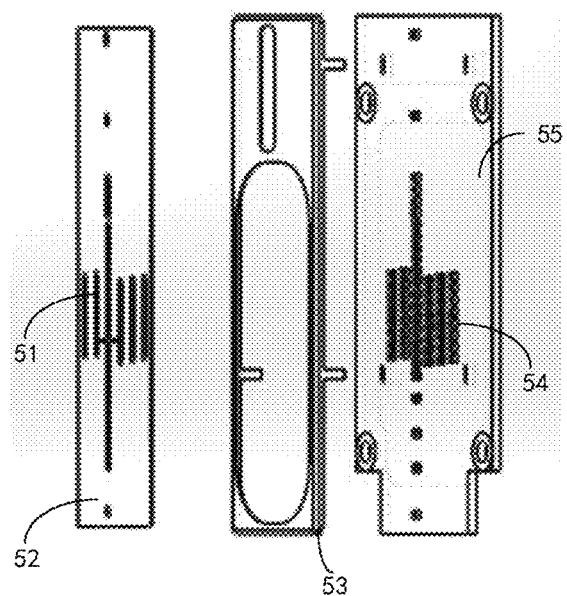
FIG. 5A shows a schematic diagram of a slot-shaped aperture according to an embodiment of the present disclosure.
Figure 5B:
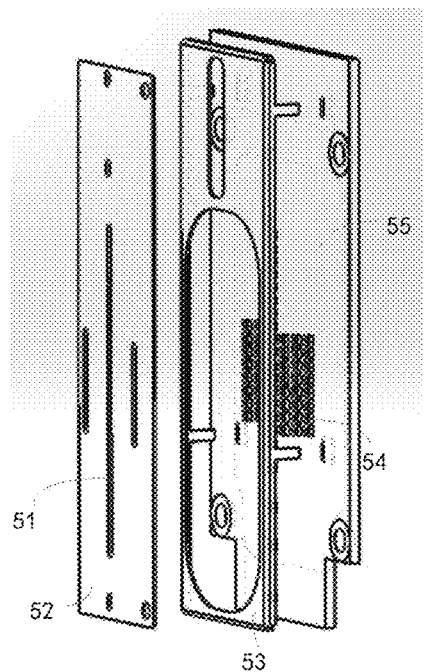
FIG. 5B shows a schematic diagram of a slot-shaped aperture according to another embodiment of the present disclosure.
Figure 6A:
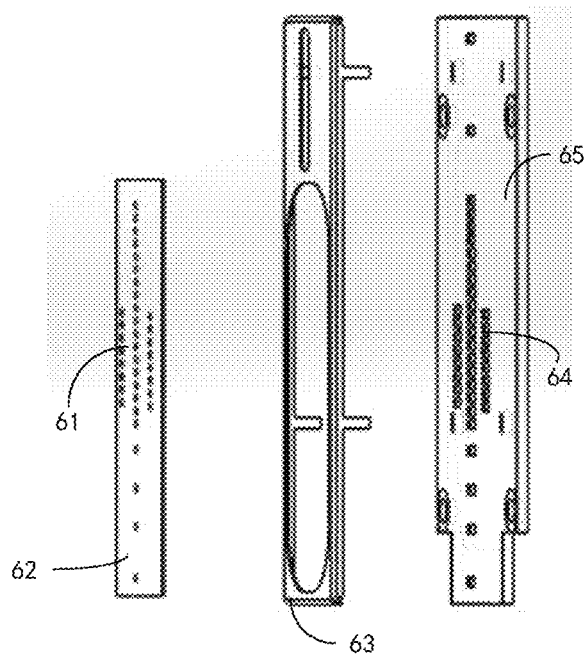
FIG. 6A shows a schematic diagram of a circular-shaped aperture according to an embodiment of the present disclosure.
Figure 6B:
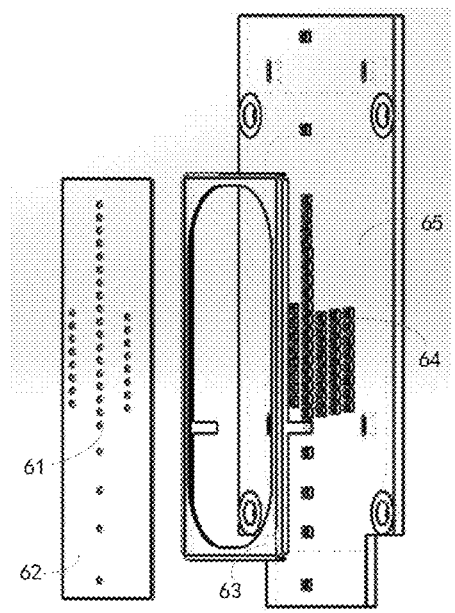
FIG. 6B shows a schematic diagram of a circular-shaped aperture according to another embodiment of the present disclosure.

In the receiving system according to an embodiment of the present disclosure, the aperture is in a shape of a slot-shaped aperture or a circular-shaped aperture. FIG. 5A and FIG. 5B show schematic diagrams of a slot-shaped aperture according to an embodiment of the present disclosure. FIG. 6A and FIG. 6B are schematic diagrams of a circular-shaped aperture according to an embodiment of the present disclosure. Alternatively, the holes of the aperture may be in a shape of a square or an oval, and the present disclosure does not constitute any limitation on the shape of the holes of the aperture.

FIG. 5A shows a schematic diagram of a slot-shaped aperture according to an embodiment of the present disclosure. As shown in FIG. 5A, the aperture 52 includes slots 51, a horizontal width of each of the slots is d, the aperture 52 is disposed on a bracket 53, for example, the aperture may be attached to the bracket 53, the bracket 53 is disposed in front of a circuit board 55, and a detector 54 may be disposed on the circuit board 55 in a linear or area array. The detector 54 may be, but is not limited to, a photodiode, such as an APD, and a distance between the aperture 52 and the detectors 54 is h. d and h satisfy the above restriction relationship. For example, after the horizontal width of the slot of the aperture is determined as d, and in a case that the above expression is an equation, the distance h between the aperture 52 and the detector 54 can be determined. The number of linear arrays (columns) of the detectors 54 corresponds to the number of slots of the aperture 52. As shown in FIG. 5A, there are 6 columns of the detectors 54 disposed on the circuit board 55, and correspondingly, there are 6 slots 51 disposed on the aperture 52 (where a width of each of the slots 51 is d, a spacing between the centers of adjacent slots 51 is set according to a spacing between the centers of adjacent linear arrays of the detectors 54 on the circuit board 55, and a length of each of the slots is also set according to a length of the linear arrays of the detectors 54 on the circuit board 55), so that all light beams from a ghost line field of view of an APD array can be blocked. In other embodiments of the present invention, the number of slots can also be adjusted as required. FIG. 5B shows a schematic diagram of a slot-shaped aperture according to another embodiment of the present disclosure. A difference from FIG. 5A is that there are 6 columns of the detectors 54 disposed on the circuit board 55 and 3 slots 51 disposed on the aperture 52, so that some of the light beams from the ghost line field of view of the APD array can be blocked as required.

When the detectors 54 rotate around an axis of the lidar, the light beams of the ghost line fields of view FOVA and FOVC are blocked by left and right sides of the slots 51 of the aperture 52, suppressing the light beams of the ghost line fields of view FOVA and FOVC from passing through, but the light beams of the main field of view FOVB can pass through the slots 51 of the aperture 52 to reach the detectors 54.

FIG. 6A shows a schematic diagram of a circular-shaped aperture according to an embodiment of the present disclosure. As shown in FIG. 6A, the aperture 62 includes circular holes 61, and a horizontal width of each of the circular holes is d (that is, a diameter of each of the circular holes is d), the aperture 62 is disposed on a bracket 63, for example, the aperture 62 may be attached to the bracket 63, and the bracket 63 is disposed in front of a circuit board 65 and located in front of a detector 64 on the circuit board 65. The detector 64 may be, but is not limited to, a photodiode, such as an APD. A distance between the aperture 62 and the detector 64 is h. d and h satisfy the above restriction relationship. For example, when the horizontal width of the circular hole of the aperture is determined as d (that is, the diameter of the circular hole), and in a case that the above expression is an equation, the distance h between the aperture 62 and the detector 64 can be determined. Each detector 64 corresponds to one circular hole 61 of the aperture 62. The number of linear arrays (columns) of the detectors 64 corresponds to the number of columns of the circular holes 61 of the aperture 62. As shown in FIG. 6A, there are 3 columns of the detectors 64 disposed on the circuit board 65, and correspondingly, there are 3 columns of the circular holes 61 disposed on the aperture 62, so that all light beams from a ghost line field of view of an APD array can be blocked.

In other embodiments of the present invention, the number of the circular holes may also be adjusted as required. FIG. 6B shows a schematic diagram of a circular-shaped aperture according to another embodiment of the present disclosure. A difference from FIG. 6A is that the number of columns of the circular holes 61 is less than the number of the linear arrays (columns) of the detectors 64. As shown in FIG. 6B, there are 6 arrays of the detectors 64 disposed on the circuit board 65, and there are 3 arrays of the circular holes 61 disposed on the aperture 62, so that the light beams from the ghost line field of view of the APD array can be blocked as required.

When the detectors 64 rotate around the axis of the lidar, the light beams of the ghost line fields of view FOVA and FOVC are blocked by a circumference of the circular holes 61 of the aperture 62, suppressing the light beams of the ghost line fields of view FOVA and FOVC from passing through, but the light beams of the main field of view FOVB can pass through the circular holes 61 of the aperture 62 to reach the detectors 64.

Another embodiment of the present disclosure is described in detail below with reference to FIG. 7 and FIG. 8.

Figure 7:
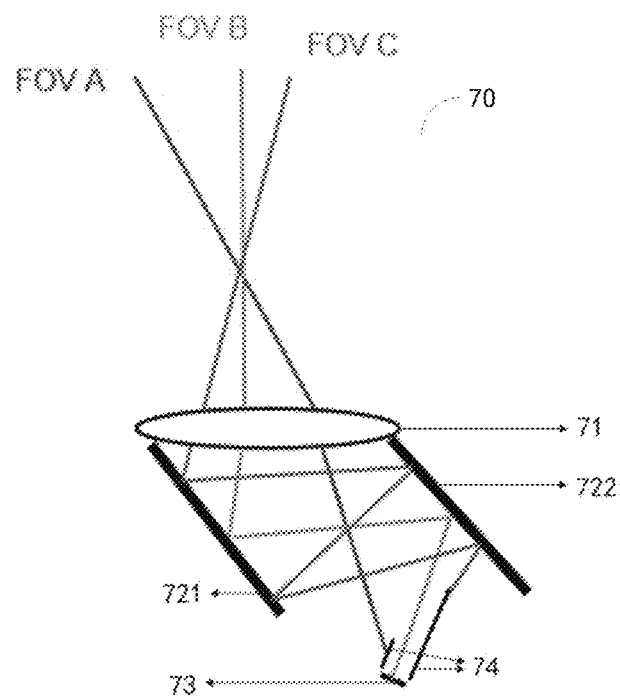
FIG. 7 shows a schematic diagram of a receiving system in which a light barrier plate suppresses ghost lines according to an embodiment of the present disclosure.

FIG. 7 shows a schematic diagram of a receiving system 70 for a lidar according to an embodiment of the present disclosure. As shown in FIG. 7, the receiving system 70 for a lidar includes: a receiving lens 71, a reflective structure, a light barrier plate 74, and a detector 73. The reflective structure includes a first mirror 721 and a second mirror 722. The receiving lens 71 may receive an external light beam, and the first mirror 721 and the second mirror 722 disposed opposite to each other and downstream of an optical path of the receiving lens 71 may receive the light beam, and change the propagation direction of the light beam by reflection, the light barrier plate 74 disposed downstream of an optical path of the first mirror 721 and an optical path of the second mirror 722 can block some or all of light beams that cause ghost lines in a point cloud of the lidar, and finally the detector 73 disposed downstream of an optical path of the light barrier plate 74 receives a light beam that is not blocked by the light barrier plate 74. The detector 73 may rotate around an axis of the lidar. Alternatively, there may be three or four mirrors, and the present disclosure does not constitute any limitation on the number of mirrors.

The light barrier plate 74 may be disposed on left and right sides of the detector 73, and may be directly disposed on a circuit board. When the detector 73 rotates around the axis of the lidar, light beams of ghost line fields of view FOVA and FOVC are blocked by the light barrier plate 74 on the left and right sides of the detector 73, suppressing the light beams of the ghost line fields of view FOVA and FOVC from reaching the detector 73, but a light beam of a main field of view FOVB is not blocked by the light barrier plate 74 and can reach the detector 73. The detector 73 may be, but is not limited to, a photodiode, such as an APD.

The detector 73 may be disposed on the circuit board in a linear array or area array. In a case of a plurality of detector arrays, a part of the light barrier plate can be multiplexed as required, to reduce the number of the light barrier plates used and suppress ghost lines in a point cloud of the lidar caused by a short-range high-reflectivity board. There may be one or more, such as two, three, or four, light barrier plates in the present disclosure, and the present disclosure does not constitute any limitation on the number of the light barrier plates.

Figure 8:
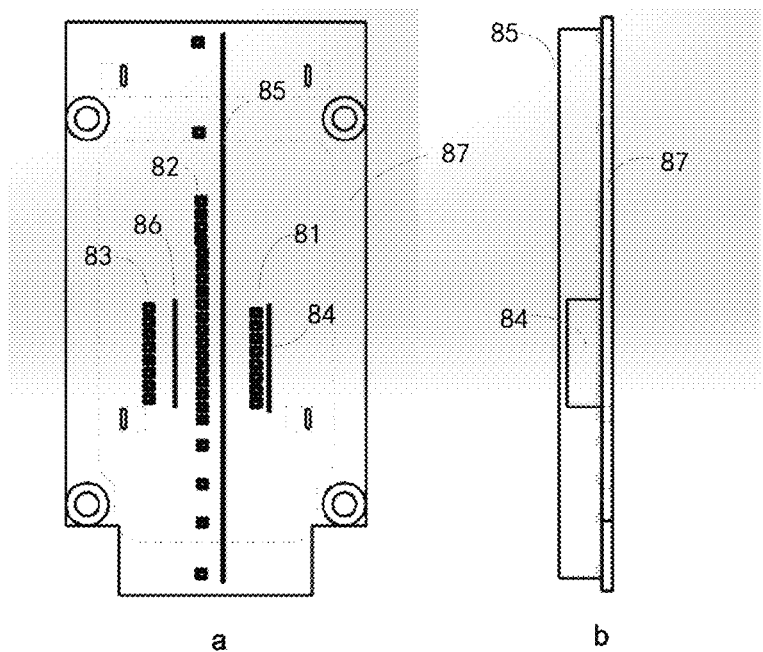
FIG. 8 shows a schematic diagram of a light barrier plate according to an embodiment of the present disclosure.

FIG. 8 shows a schematic diagram of a light barrier plate according to an embodiment of the present disclosure. a is a front view and b is a right view. As shown in a in FIG. 8, detector arrays 81, 82, and 83 are disposed on a circuit board 87, and light barrier plates 84, 85, and 86 are also disposed on the circuit board 87. In an embodiment, the light barrier plates 84, 85, and 86 are vertically disposed on the circuit board 87. The detector arrays 81 and 82 share the light barrier plate 85, and the detector arrays 82 and 83 share the light barrier plate 86, which reduces the number of the light barrier plates used and suppresses ghost lines in a point cloud of the lidar caused by a short-range high-reflectivity board.

According to an embodiment of the present disclosure, a focal length of the receiving lens of the receiving system is set to 69 mm, an angle between the first mirror and a horizontal direction is 45 degrees, and an angle between the second mirror and the horizontal direction is 51 degrees. As shown in a in FIG. 8, from left to right, horizontal distances between the center of each column of APDs to the light barrier plates are 2.45 mm, 1.95 mm, 1.25 mm respectively, and from left to right, when heights of the light barrier plates are 4 mm, 4 mm, and 3.2 mm respectively, the ghost line field of view can be well suppressed.

In the above embodiment, the system of the lidar includes the aperture or the light barrier plate respectively as a ghost line reduction device. In the receiving system according to an embodiment of the present disclosure, the ghost line reduction device can also use both the aperture and the light barrier plate to suppress ghost lines in a point cloud of the lidar by a short-range high-reflectivity board.

The present disclosure further provides a lidar, including: an emitting system and the receiving system as described above. The emitting system may emit a laser beam for detecting a target, and the receiving system may receive an echo of the laser beam reflected by the target. When a detected target is a short-range high-reflectivity obstacle, the receiving system can suppress the high-reflectivity obstacle from generating ghost lines in a point cloud of the lidar, avoid misrecognition of the lidar, and improve the detection accuracy. In addition, because the ghost line reduction device does not block light beams of a main field of view, the impact on the ranging capability of the lidar is minimized.

Figure 9:
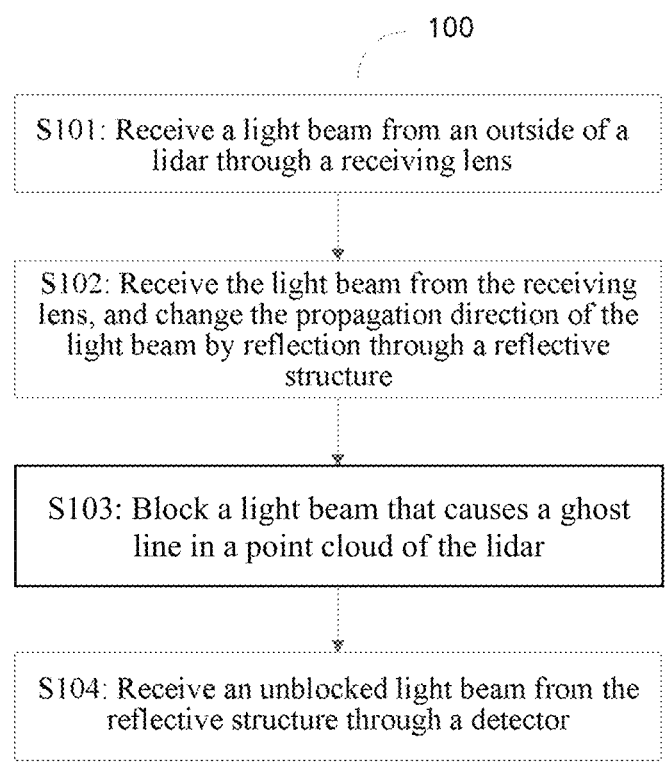
FIG. 9 shows a method for suppressing ghost lines generated in a point cloud of a lidar according to an embodiment of the present disclosure.

FIG. 9 shows a method 100 for suppressing ghost lines generated in a point cloud of a lidar according to an embodiment of the present disclosure. As shown in FIG. 9, the method specifically includes the following steps:

Step S101: Receive a light beam from an outside of the lidar through a receiving lens.

Step S102: Receive the light beam from the receiving lens, and change the propagation direction of the light beam by reflection through a reflective structure.

Step S103: Block a light beam that causes a ghost line in a point cloud of the lidar.

Step S104: Receive an unblocked light beam from the reflective structure through a detector.

According to an embodiment of the present disclosure, the step of blocking light beams from the reflective structure that cause ghost lines in a point cloud of the lidar includes: blocking the light beams that cause the ghost lines in the point cloud of the lidar through an aperture and/or a light barrier plate.

By using a ghost line reduction device, such as a specific aperture and/or a light barrier plate, the receiving system for a lidar of the present disclosure resolves the problem of lidar misrecognition caused by ghost lines in a point cloud of the lidar caused by a short-range high-reflectivity obstacle. In autonomous driving, when scanning a short-range high-reflectivity road sign, the lidar of the present disclosure can suppress the generation of ghost lines in the point cloud of the lidar by the road sign, and improve the detection accuracy.

The above descriptions are merely some embodiments of the present disclosure, but are not intended to limit the present disclosure. Any modification, equivalent replacement, or improvement made within the spirit and principle of the present disclosure shall fall within the protection scope of the present disclosure.

It should be finally noted that: the foregoing descriptions are merely some embodiments of the present disclosure, but are not intended to limit the present disclosure. Although the present disclosure has been described in detail with reference to the foregoing embodiments, for a person of ordinary skill in the art, modifications can be made to the technical solutions described in the foregoing embodiments, or equivalent replacements can be made to some technical features in the technical solutions. Any modification, equivalent replacement, or improvement made within the spirit and principle of the present disclosure shall fall within the protection scope of the present disclosure.

What is claimed is:

1. A receiving system for a lidar, comprising:
    a receiving lens, configured to receive echoes of a detection laser beam reflected by an object from an exterior of the lidar;
    a reflective structure, disposed downstream of an optical path of the receiving lens, to receive the echoes from the receiving lens, and change a propagation direction of the echoes by reflection;
    a detector, disposed downstream of an optical path of the reflective structure to receive a reflected echo from the reflective structure; and
    a ghost line reduction device, disposed between the reflective structure and the detector, wherein the ghost line reduction device includes a physical structure to block an echo that causes a ghost line in a point cloud of the lidar from entering the detector,
    wherein the ghost line reduction device comprises at least one of an aperture or one or more light barrier plates,
    wherein the aperture and the detector satisfy the following relationship:

$$\arctan\left(\frac{d}{2h}\right) \le \arctan\left(\frac{D}{2f}\right)$$

D representing a diameter of the receiving lens, f representing a focal length of the receiving lens, h representing a distance between the aperture and the detector, and
d representing a width of the aperture,
wherein the detector and the one or more light barrier plates are disposed on a common circuit board, the one or more light barrier plates being located on one or both lateral sides of the detector on the common circuit board.

2. The receiving system according to claim 1, wherein the aperture comprises a slot-shaped aperture or a circular-shape aperture, and the aperture is made of one of following materials: metal, glass capable of absorbing or reflecting light, or ceramic.

3. The receiving system according to claim 1, wherein the reflective structure comprises a plurality of mirrors, and the ghost line reduction device is configured to block an echo other than an echo that is reflected once by the mirrors of the reflective structure.

4. The receiving system according to claim 1, wherein the reflective structure comprises a first mirror and a second mirror disposed opposite to each other, the detector comprises a photodiode, and the ghost line reduction device is configured to block an echo other than an echo that is reflected once by the first mirror and once by the second mirror.

5. The receiving system according to claim 1, wherein the ghost line reduction device comprises the aperture and the light barrier plate.

6. A lidar, comprising:
    an emitting system comprises a plurality of emitters to emit a detection laser beam; and
    a receiving system, wherein the receiving system comprises:
        a receiving lens, configured to receive echoes of the detection laser beam reflected by an object;
        a reflective structure, disposed downstream of an optical path of the receiving lens, to receive the echoes from the receiving lens, and change a propagation direction of the echoes by reflection;
        a detector, disposed downstream of an optical path of the reflective structure to receive a reflected echo from the reflective structure; and
        a ghost line reduction device, disposed between the reflective structure and the detector, wherein the ghost line reduction device includes a physical structure to block an echo that causes a ghost line in a point cloud of the lidar from entering the detector,
    wherein the ghost line reduction device comprises at least one of an aperture or one or more light barrier plates,
    wherein the aperture and the detector satisfy the following relationship:

$$\arctan\left(\frac{d}{2h}\right) \le \arctan\left(\frac{D}{2f}\right)$$

D representing a diameter of the receiving lens, f representing a focal length of the receiving lens, h representing a distance between the aperture and the detector, and
d representing a width of the aperture,
wherein the detector and the one or more light barrier plates are disposed on a common circuit board, the one or more light barrier plates being located on one or both lateral sides of the detector on the common circuit board.

7. The lidar according to claim 6, wherein the aperture comprises a slot-shaped aperture or a circular-shape aperture, and the aperture is made of one of following materials: metal, glass capable of absorbing or reflecting light, or ceramic.

8. The lidar according to claim 6, wherein the reflective structure comprises a plurality of mirrors, and the ghost line reduction device is configured to block an echo other than an echo that is reflected once by the mirrors of the reflective structure.

9. The lidar according to claim 6, wherein the reflective structure comprises a first mirror and a second mirror disposed opposite to each other, the detector comprises a photodiode, and the ghost line reduction device is configured to block an echo other than an echo that is reflected once by the first mirror and once by the second mirror.

10. The lidar according to claim 6, wherein the ghost line reduction device comprises the aperture and the light barrier plate.

11. A method for suppressing ghost lines for a lidar, comprising:
receiving, through a receiving lens, echoes of a detection laser beam reflected by an object from an exterior of the lidar;
receiving, through a reflective structure, the echoes from the receiving lens, and changing a propagation direction of the echoes by reflection;
blocking, by a ghost line reduction device, an echo that causes a ghost line in a point cloud of the lidar; and
receiving an unblocked echo from the reflective structure through a detector,
wherein the ghost line reduction device comprises at least one of an aperture or one or more light barrier plates,
wherein the aperture and the detector satisfy the following relationship:

$$\arctan\left(\frac{d}{2h}\right) \leq \arctan\left(\frac{D}{2f}\right)$$

D representing a diameter of the receiving lens, f representing a focal length of the receiving lens, h representing a distance between the aperture and the detector, and
d representing a width of the aperture,
wherein the detector and the one or more light barrier plates are disposed on a common circuit board, the one or more light barrier plates being located on one or both lateral sides of the detector on the common circuit board.

* * * * *